US009167808B2

(12) United States Patent
Tucker et al.

(10) Patent No.: US 9,167,808 B2
(45) Date of Patent: Oct. 27, 2015

(54) FISH EGG SWEEPER

(76) Inventors: Randall L. Tucker, Findlay, OH (US);
John A. D. McArthur, Pueblo, CO (US)

( * ) Notice: Subject to any disclaimer, the term of this patent is extended or adjusted under 35 U.S.C. 154(b) by 420 days.

(21) Appl. No.: 13/501,344

(22) PCT Filed: Oct. 12, 2010
(Under 37 CFR 1.47)

(86) PCT No.: PCT/US2010/052348
§ 371 (c)(1),
(2), (4) Date: Oct. 25, 2012

(87) PCT Pub. No.: WO2011/046948
PCT Pub. Date: Apr. 21, 2011

(65) Prior Publication Data
US 2013/0232850 A1   Sep. 12, 2013

Related U.S. Application Data

(60) Provisional application No. 61/250,756, filed on Oct. 12, 2009.

(51) Int. Cl.
*E04H 4/16* (2006.01)
*A01M 99/00* (2006.01)
*A01K 61/00* (2006.01)
*A01K 63/04* (2006.01)

(52) U.S. Cl.
CPC ............... *A01M 99/00* (2013.01); *A01K 61/00* (2013.01); *A01K 63/04* (2013.01)

(58) Field of Classification Search
CPC ..... A01K 99/00; A01K 61/006; A01K 63/04; A01M 99/00
USPC ..................... 43/4, 9.1, 100, 101, 103; 15/1.7
IPC ......................... A01K 69/06, 69/08; E04H 4/16
See application file for complete search history.

(56) References Cited

U.S. PATENT DOCUMENTS

| 2,951,761 | A | 9/1960 | Stephan |
| 4,351,127 | A | 9/1982 | Mitchell |
| 5,016,383 | A | 5/1991 | Rizzetto |
| 6,340,468 | B1 | 1/2002 | Cutler et al. |
| 6,764,596 | B2 | 7/2004 | Tucker |
| 2006/0102086 | A1 | 5/2006 | Abraham |

OTHER PUBLICATIONS

PCT/US2010/052348 International Search Report and Written Opinion.

*Primary Examiner* — David Redding
(74) *Attorney, Agent, or Firm* — Fay Sharpe LLP

(57) ABSTRACT

A device for handling fish eggs and other benthic macro invertebrates is provided for removal from a surface of a waterway. An enlarged, generally planar housing has a lower surface formed of a material having sufficient flexibility so that a vacuum that communicates through a collector cavity can remove fish eggs, for example, from a waterway. Fish eggs can be destroyed, either with high pressure fluid that may be a part of the vacuum assembly, or mechanically destroyed, or alternatively the fish eggs may be filtered or separated from the remainder of the collected material. Fluid such as water, saline, chemical or toxins, warm water, etc., are preferably introduced into the waterway surface about the periphery of the housing to treat and/or dislodge the fish eggs.

21 Claims, 5 Drawing Sheets though these particular dimensions and shapes should not be deemed to be limiting. The rectangular conformation is desirable, however, since multiple housings may be advantageously joined together to increase the surface area of the waterway being

FISH EGG SWEEPER

This application is a 371 national entry of international application PCT/US2010/052348, filed Oct. 12, 2010, which claims the priority benefit of U.S. provisional application Ser. No. 61/250,756, filed Oct. 12, 2009, which is expressly incorporated herein by reference.

BACKGROUND OF THE DISCLOSURE

This application relates to a method and an apparatus for removing select material from an associated waterway. More particularly, this disclosure relates to a method and apparatus for removing non-indigenous species of macro invertebrates and fish eggs from a waterway.

The owner of the present disclosure also commonly owns U.S. Pat. No. 7,513,008 which is directed to an apparatus for directing pressurized water into a substrate to dislodge small sediment and gravel particles from interstitial spaces within larger cobble and gravel of a stream bed. The entire disclosure of the commonly-owned patent is hereby expressly incorporated herein by reference.

Studies have shown that select fish species introduced either purposefully or inadvertently into certain streams and lakes have become increasingly problematic because these non-indigenous species prey upon and potentially compete with native and sport fish. Known methods to control or reduce these invasive species include harvesting the selected species, commercial scale netting, disrupting spawning, and stocking the waterway with sterile fish (see FISHERIES, vol. 34, no. 9, September 2009, "Western Lake Trout Woes"). Such efforts to control the invasive, non-indigenous species are expensive, and only partially successful. Thus, a need exists for an alternative method and apparatus for addressing this problem that is effective, relatively inexpensive, and does not adversely impact other native fish species or the associated waterway.

SUMMARY OF THE DISCLOSURE

A fish egg sweeper and associated method have been developed for removing selected macro invertebrates and fish eggs from a waterway.

The fish egg sweeper preferably includes a housing having a lower, first surface dimensioned for receipt on a bottom surface of an associated waterway, a cavity in a portion of the housing that communicates with the first surface, perimeter openings in the housing for directing flow and establishing a suction velocity from an associated fluid source toward the associated waterway, a collector opening that communicates with the associated waterway adjacent the first surface of the housing, and an associated vacuum source for removing material from the associated waterway.

The first surface of the housing preferably has a substantially planar conformation and is formed from a flexible material.

An ejector pump communicates with the collector opening to create a vacuum.

A hinged support is preferably provided along a portion of the housing for facilitating movement of the housing in the associated waterway.

A manifold receives the pressurized flow and distributes fluid and determines the flow velocity to perimeter locations of the housing.

A fish egg rupturing device may be included. One form of rupturing device directs collected fish eggs through pressurized fluid, while another embodiment directs the collected fish eggs through a mechanical rupturing member.

Another embodiment employs a filter for separating the collected fish eggs from the remaining collected material.

A preferred method of collecting the fish eggs includes directing pressurized fluid to displace fish eggs from an associated waterway surface, and using a vacuum force to collect the displaced fish eggs.

The directing step includes providing a flexible surface that generally conforms to the associated waterway surface.

The method includes orienting pressurized fluid along a peripheral portion of the flexible surface.

The collected fish eggs may be ruptured by mechanically piercing the fish eggs, or using pressurized fluid.

Alternatively, the collected eggs may be filtered from the remainder of the material collected from the associated waterway.

Still other advantages and benefits of the disclosure will become apparent upon reading and understanding the following detailed description.

DETAILED DESCRIPTION OF THE PREFERRED EMBODIMENTS

Figure 1:
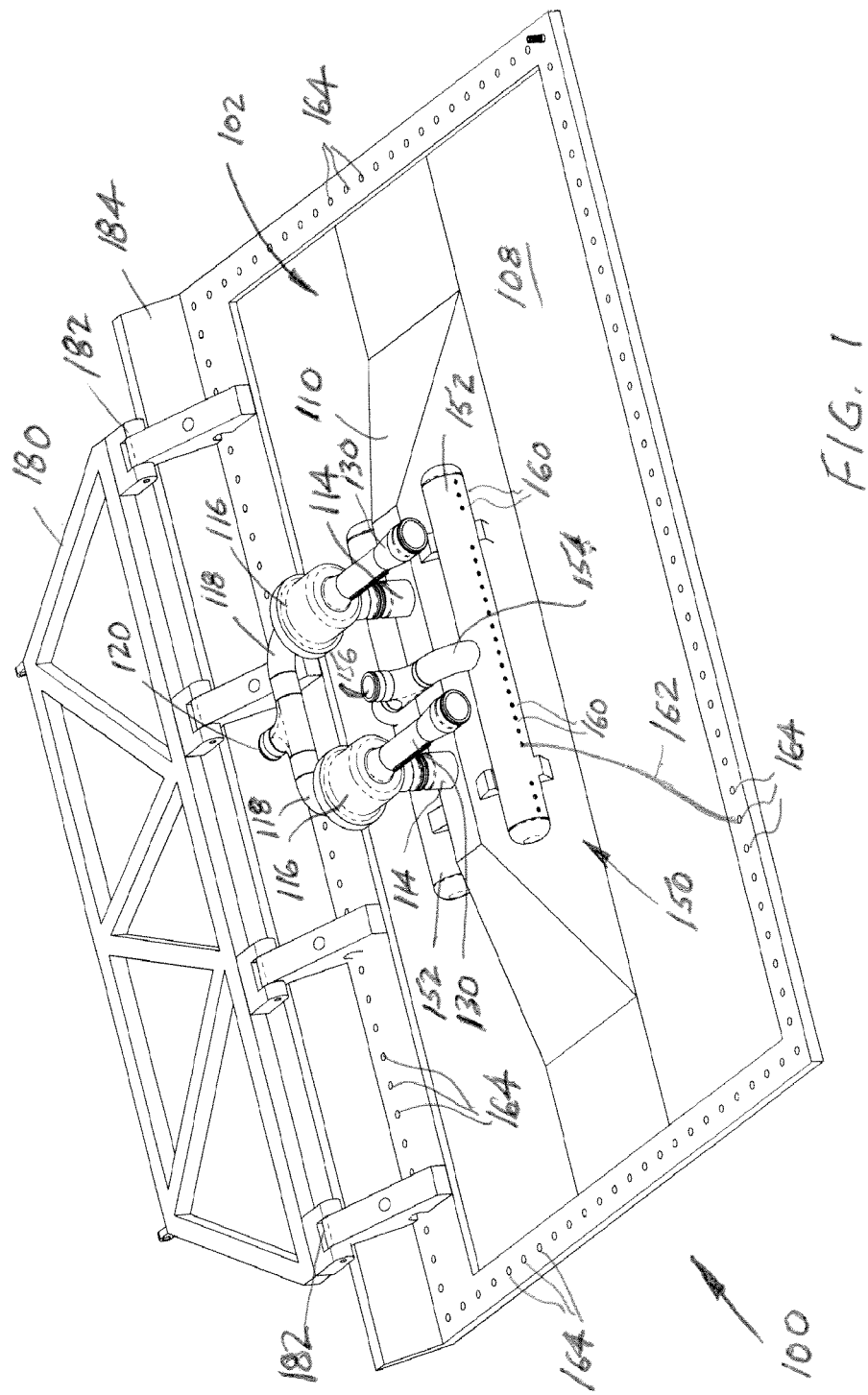
FIG. 1 is a perspective view of a preferred form of a fish egg sweeper.
Figure 2:
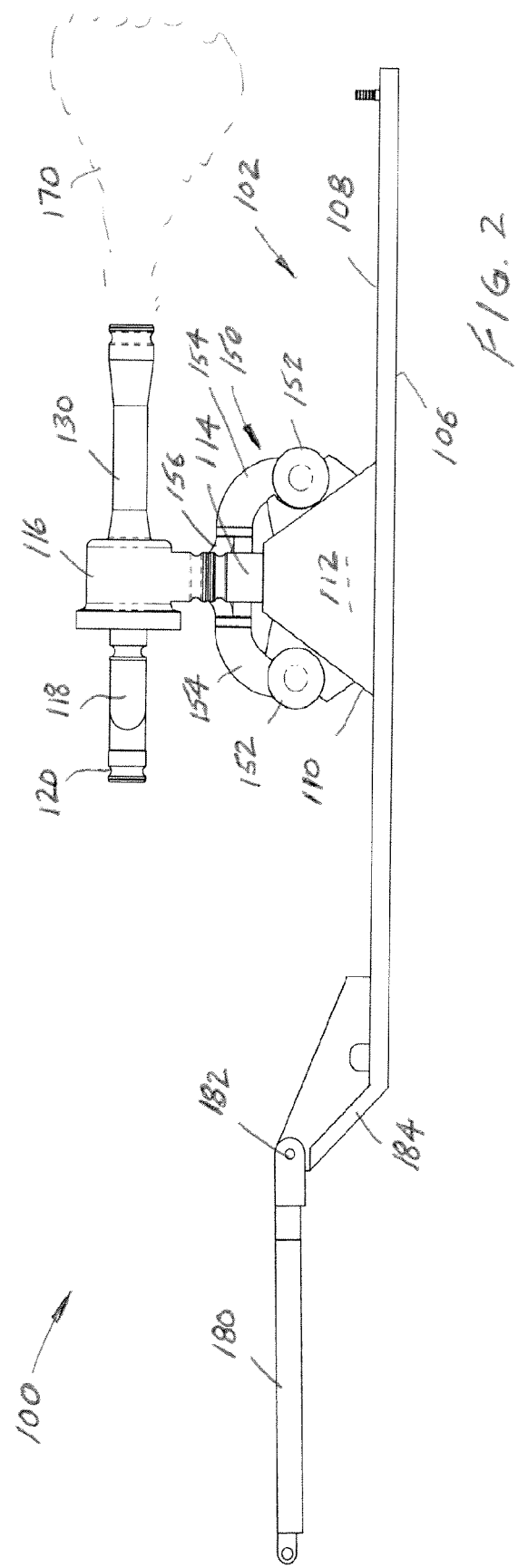
FIG. 2 is a side elevational view of the sweeper of FIG. 1, taken generally from the left-hand side thereof.

FIGS. 1-5 show a device 100 and an associated method of treating or handling fish eggs, embryos, bivalves, or similar benthic (i.e., found in the ecological region at the lowest level or strata of a body of water) macro invertebrates (all of which are sometimes generally referred to as "fish eggs" in the present application). The device will be generally referred to as a "fish egg sweeper" in the present application used to handle or treat fish eggs, e.g., euthanizing and/or removing targeted embryonic-to-adult species (including fish eggs) in a waterway (river, stream, pond, lake, etc.). For example, the fish egg sweeper 100 finds particular application in removing, treating, handling, and/or euthanizing fish eggs. This fish egg sweeper is typically used to remove non-indigenous or invasive species, particularly where such non-indigenous species have resulted in problems in the waterway, although there may be instances where native species are removed for other purposes. By "handling" or "treating" the fish eggs, it will be understood by one skilled in the art that these terms refer to in-site treating, dislodging, euthanizing, and/or removing the fish eggs for subsequent separation, filtering, treating, euthanizing, destruction, etc.

A preferred form of a fish egg sweeper 100 includes a housing or mat 102 having a lower, first surface 106 and an upper, second surface 108. Preferably, the housing has a generally or substantially planar conformation, and in one form has a generally rectangular conformation, for example on the order of four feet by six feet (4'×6'), although these particular dimensions and shapes should not be deemed to be limiting. The rectangular conformation is desirable, however, since multiple housings may be advantageously joined together to increase the surface area of the waterway being treated. The housing preferably is substantially entirely formed from a flexible material, or at least has a flexible base, such as a rubber or urethane material construction. The housing 102 has sufficient flexibility so that when the housing is dragged or moved over a bottom surface of an associated waterway, for example, the housing generally conforms to the waterway surface and allows effective vacuum or suction forces to be formed along the lower surface 106 with the waterway bottom surface.

More particularly, a collector such as collector 110 has a generally trapezoidally-shaped cross-section and has an internal cavity 112 that communicates with the lower surface 106 of the housing. The internal cavity design reduces the flow of the suction proportionally to the surface area of the lower portion of the cavity. The collector and cavity extend above a remainder of the generally planar housing and in the preferred embodiment are generally centrally located in the housing, although this need not necessarily be the only desired configuration. Sloped or angled sidewalls of the trapezoidally-shaped collector are useful when the vacuum force is applied through an upper portion of the collector, shown here as a pair of outlet passages 114 that communicate with the cavity 112 and with a vacuum source. In one preferred arrangement, the vacuum or negative suction force is provided by a pair of ejector pumps 116 that receive pressurized fluid at their respective inlet ends 118 (from a source that may be outside the waterway, e.g., shore, surface vessel, or the like) and more desirably in one preferred arrangement communicate with an inlet or "T" 120 that provides pressurized fluid from the single passage and splits the fluid into the separate inlets 118 associated with respective ejector pumps The ejector pumps include outlet passages 130 that draw a vacuum through passage 114 that intersects with the ejector pump 116. In a manner well known in the art, the passage of pressurized fluid flow from the inlets 118 to the outlets 130 of the ejector pumps 116 draws a vacuum in passages 114 and thereby collects material from the lower surface 106 of the housing, into the housing cavity 112, and ejects the vacuumed material through outlet 130.

Although this is a preferred manner of applying a vacuum to the cavity, it will be understood that other sources of vacuum can be used without departing from the scope and intent of the present invention. Thus, separate vacuum lines can be substituted for the ejector pumps for communication with a source of vacuum (not shown but, for example, as typically located outside the waterway such as provided on shore) to provide the desired suction or vacuum force along the lower surface 106 of the housing, and thereby urge or draw the fish eggs into the cavity 112.

Of course, the above description presumes that the fish eggs are free or detached in the waterway and can be easily vacuumed into the housing cavity when encompassed by the fish egg sweeper. In some instances, however, the fish eggs must be dislodged from the waterway surface, e.g., separated from the cobble, gravel, rock, etc., that forms a part of the waterway surface, before the fish eggs can be drawn into the housing cavity by the vacuum force. To achieve this, fluid is introduced at the site of the fish eggs in the waterway. In some instances, the fish eggs are treated (e.g., exposed to a toxic fluid, heated fluid, saline solution, chemical, or pressurized fluid on the order of approximately 120 psi or greater, etc.) in-situ to either aid in dislodging the fish eggs and/or euthanizing the fish eggs in the waterway. The fluid portion may at least in part be the waterway fluid that is either pressurized or which is otherwise modified (e.g., heated, or a toxin, salt, chemical, etc. added to the fluid). The vacuum force will then remove any fish eggs that have been dislodged, and/or likewise remove any fluid that is introduced into the waterway.

Figure 3:
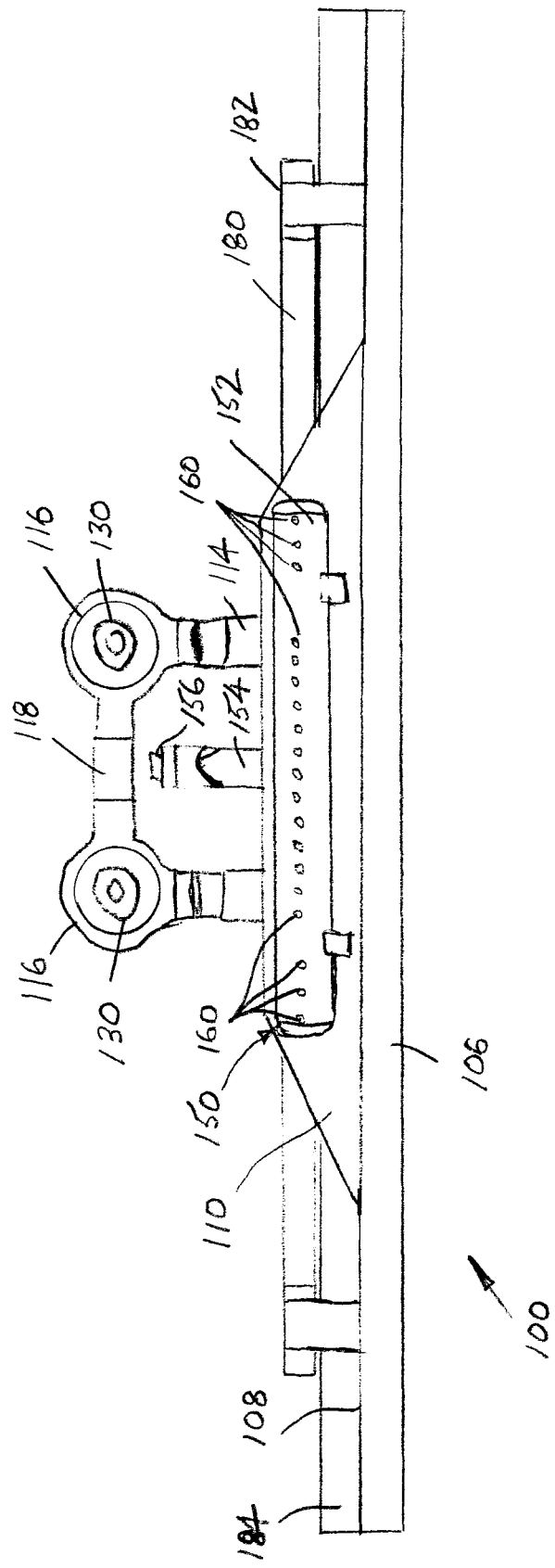
FIG. 3 is a front elevational view of the fish egg sweeper of FIG. 1.
Figure 4:
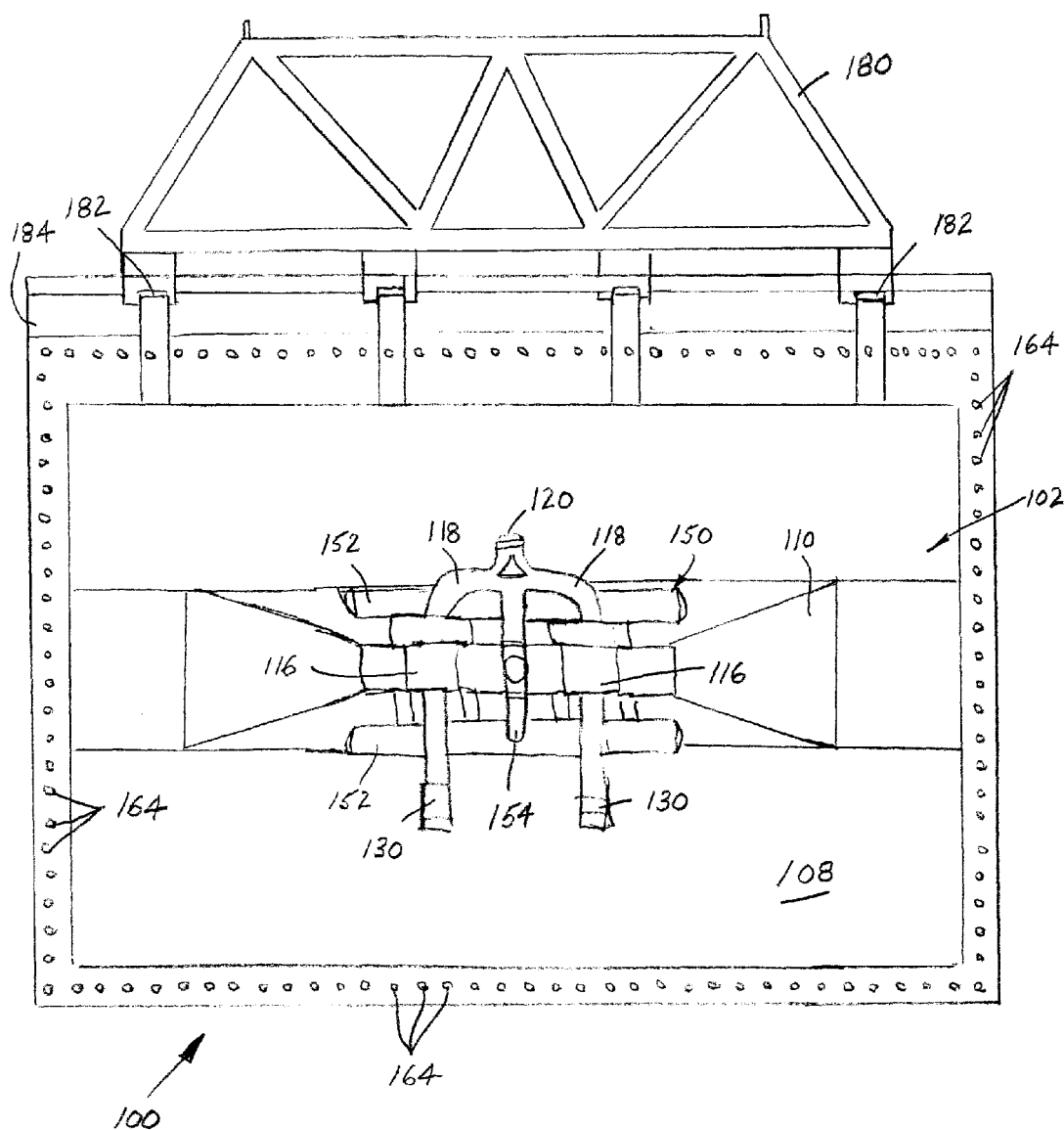
FIG. 4 is a plan view of the fish egg sweeper of FIG. 1.
Figure 5:
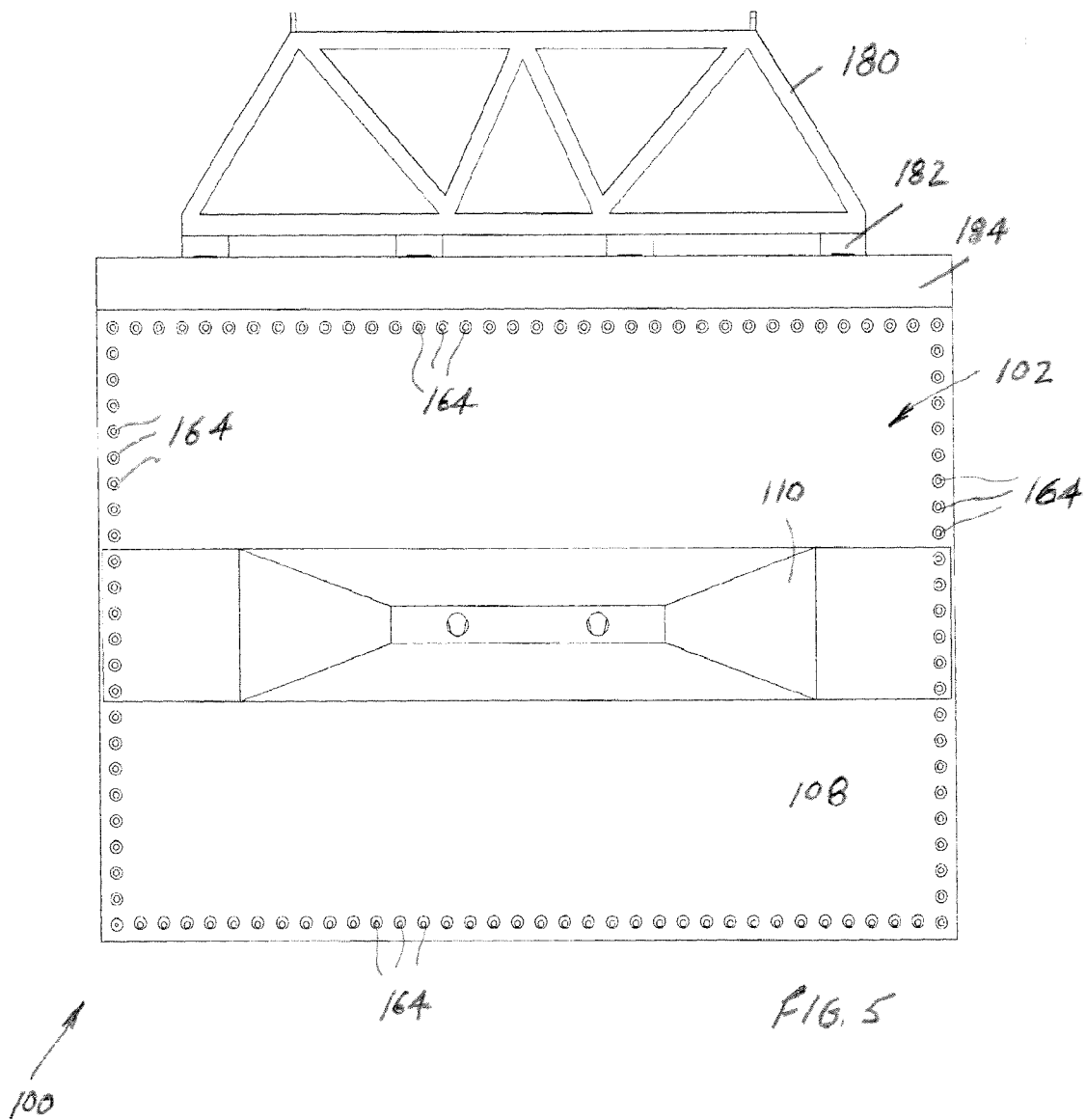
FIG. 5 is a plan view similar to FIG. 4 with selected portions of the apparatus removed for ease of illustration.

The fluid may be waterway fluid and/or a fluid introduced from outside the waterway (e.g., from shore, surface vessel, etc.) that is pressurized and then routed as additionally illustrated in FIGS. 1-4. More particularly, a manifold assembly 150 includes first and second manifolds 152 that are commonly supplied with fluid, for example, from inlets 154 that in the preferred arrangement are operatively connected to a common inlet 156. Each of the manifolds preferably includes a series of openings 160 (FIGS. 1 and 3). Each of these openings includes a line or passage 162, only one of which is shown in FIG. 1 for ease of illustration that communicates with a peripheral opening 164 in a perimeter portion of the housing. In other words, each opening 160 in the first and second manifolds 152 communicates with an individual opening 164, for example, in the periphery of the housing. The openings 164 extend through the housing and thus direct fluid from the common inlet 156, through individual inlets 154, to the manifolds 152, through manifold outlet openings 160, through passages 162 to openings 164 (only one of which is shown in FIG. 1) that are disposed about the perimeter of the bottom surface 106 of the housing. This arrangement provides a perimeter curtain of fluid flow from all or some of the openings 164 that surrounds the perimeter of the lower surface 106, and likewise surrounds the inlet to cavity 112.

As noted above, the fluid can be heated, toxic, saline, pressurized, etc. to treat the fish eggs and other invasive species. Pressurized fluid such as water can be introduced through this pathway and creates sufficient turbulence to loosen the fish eggs from the waterway surface. Alternatively, heated water may be introduced through the openings 164 where the difference in temperature thermally shocks the fish eggs to facilitate removal of the fish eggs from the bottom surface of the waterway. Of course, still other materials can be used to dislodge the eggs from the bottom surface as the housing is dragged over the cobble or lower surface of the waterway. Introducing other fluids (pressurized or otherwise) may be particularly useful in treating the fish eggs. A saline solution, for example, can treat the fish eggs in-situ or facilitate dislodging of the fish eggs. Likewise, a synthetic toxin may be introduced through the openings 164 (for example for treating zebra mussels where a local inoculation with a synthetic toxin may be operative for eradicating the zebra mussels) and the toxin and/or fish eggs subsequently effectively removed from the waterway through the collector cavity to prevent dispersal through the remainder of the waterway. Likewise, other chemicals or toxin materials that could be introduced into and around colonies of zebra, quagga, or other invasive bivalve species may find particular application because of the subsequent removal of this introduced material through the vacuum applied to the lower surface 106 of the housing. Because the waterway might be used for drinking or agricultural use, it would be important to contain any excessive release of such a substance into the remainder of the waterway. However, this controlled dispersal into the bottom surface of the waterway with immediate removal through the collector cavity 112 reduces such concerns.

In the arrangement shown in FIGS. 1-5, the fish eggs collected from the bottom surface of the waterway are drawn in to the cavity 112 and expelled through outlets 130 of the ejector pumps. This necessarily intermixes the fish eggs with the high pressure fluid that operates the ejector pumps. The pressurized fluid can advantageously also serve to rupture the fish eggs and destroy/euthanize the fish eggs. Alternatively, the fish eggs may be directed through an outlet passage to a rupturing device, such as a series of pins or needles that mechanically pierce the fish eggs as the fish eggs travel through the passage. In still another arrangement, the collected fish eggs are separated from the remainder of the collected material, such as through a filter, screen, membrane, cyclonic separator, or similar density separation device in order to separately collect or treat the fish eggs.

As noted above, introduction of the collected material into the high pressure fluid associated with the outlet passages 130 of the ejector pumps likely results in destruction of many fish eggs collected through this process. Alternatively, the vacuum removal would allow for mechanical piercing, or even separate delivery to a highly flexible and expandable bag-like structure 170 represented in broken line in FIG. 2 where the fish eggs or other collected material could be effectively filtered from the water from the waterway. Of course, it will be necessary to periodically empty the bag-like structure. It is also contemplated that the expandable bag-like structure 170 need not be in close communication with the outlet 130 but may be disposed at a remote location.

The size of the system may be varied, and the elastomeric properties of the arrangement modified to suit the particular waterway selected for treatment. Likewise, system balancing and dimensional sizing of the pumping capabilities could also be advantageously tuned to meet the particular requirements of a selected waterway.

FIGS. 1, 2, 4, and 5 also more particularly illustrate a mounting member 180 that is preferably pivotally or hingedly connected at 182 to the remainder of the housing. For example, member 180 may be secured to an off-shore structure such as a cable or flexible line for dragging the housing over the bottom surface of the waterway. Preferably, an upwardly angled edge 184 is provided at a leading edge, i.e., the edge adjacent the structure 180, that advances the housing over the waterway bottom surface. The angled, leading edge surface of the housing aids in traversing an uneven bottom surface of the waterway by allowing the housing to ride up and over obstructions of a certain height.

This fish egg sweeper device is particularly designed for and targets fish egg harvesting. The functionality of the fish egg sweeper includes, among other features, injecting a fluid such as water at high pressure, at multiple points, deep into the spawning substrate with a powerful suction phase that targets objects with density and mass characteristics of fish embryos. The fish egg sweeper is not particularly designed to remove quantities of sand or sediment from interstitial spaces, but instead targets negatively buoyant fish embryos that have been deposited into cobble substrate. The mat-like, planar footprint of the housing has a significantly large area and is particularly useful in being manipulated over simple gravel and cobble substrate. The fish egg sweeper may lend itself to automated remote operation at substantial depths or may be scaled to a smaller model that can be easily transported and then carried by two people, or up-scaled to significantly larger, machine operated sizes. As noted previously, multiple mats or housings may also be interleaved to provide a broad area coverage.

The disclosure has been described with reference to the preferred embodiments. Modifications and alterations will occur to others upon reading and understanding this specification. It is intended to include all such modifications and alterations in so far as they come within the scope of the appended claims or the equivalents thereof.

Having thus described the invention, We claim:

1. A fish egg sweeper comprising:
   a housing having a lower, first surface having a substantially planar conformation formed from a flexible material and dimensioned for receipt on a bottom surface of the associated waterway;
   a cavity in a portion of the housing thereof that communicates with the lower surface and collects water and material from the associated waterway;
   perimeter openings in the housing for directing flow from an associated pressurized fluid source and outwardly from the lower, first surface; and
   a collector opening communicating with the cavity and an associated vacuum source for removing material therethrough.

2. The fish egg sweeper of claim 1 further comprising an ejector pump that creates a vacuum that communicates with the collector opening in response to pressurized flow through the ejector pump.

3. The fish egg sweeper of claim 1 further comprising a support extending from the housing for moving the housing in the associated waterway.

4. The fish egg sweeper of claim 3 further comprising a hinge interposed between the support and the housing.

5. The fish egg sweeper of claim 1 further comprising at least one manifold adapted for communication with an associated pressurized fluid source and the plural openings extending about the housing perimeter.

6. The fish egg sweeper of claim 5 further comprising a second manifold disposed in parallel with the at least one manifold for communication with a different set of the plural openings extending about the housing perimeter.

7. The fish egg sweeper of claim 1 further comprising a fish egg rupturing device.

8. The fish egg sweeper of claim 7 wherein the fish egg rupturing device uses pressurized fluid.

9. The fish egg sweeper of claim 7 further comprising a mechanical rupturing member disposed in an outlet passage extending from the collector opening.

10. The fish egg sweeper of claim 1 wherein the cavity is generally centrally located therein.

11. The fish egg sweeper of claim 10 wherein one edge of the housing angles upwardly for connection with a support hinged to the housing.

12. A method of treating fish eggs in a waterway comprising:
   providing a flexible surface that generally conforms to a waterway surface;
   directing pressurized fluid outwardly from a perimeter of the flexible surface toward a waterway surface to displace fish eggs from the waterway serface; and
   using a vacuum force to collect the displaced fish eggs.

13. The method of claim 12 further comprising separating the collected fish eggs from the waterway.

14. The method of claim 13 wherein the separating step includes passing water and fish eggs vacuumed from the waterway through a filter to separate the water and fish eggs.

15. The method of claim 13 wherein the separating step includes rupturing the fish eggs.

16. The method of claim 15 wherein the rupturing step includes mechanically piercing the fish eggs.

17. The method of claim 15 wherein the rupturing step includes pressurizing the fluid to break the fish eggs.

18. The method of claim 12 wherein the fluid directing step includes introducing a saline solution in-situ around the fish eggs.

19. The method of claim 12 wherein the fluid directing step includes introducing a heated fluid above the temperature of water in the associated waterway in-situ around the fish eggs.

20. The method of claim 12 wherein the fluid directing step includes introducing a chemical or toxic material in-situ around the fish eggs.

21. The method of claim 12 wherein the fluid directing step includes pressurizing the fluid to at least approximately 120 psi.

* * * * *